US009985505B2

(12) United States Patent
Honjo (10) Patent No.: US 9,985,505 B2
(45) Date of Patent: May 29, 2018

(54) ROTOR OF ROTATING ELECTRIC MACHINE

(71) Applicant: HONDA MOTOR CO., LTD., Tokyo (JP)

(72) Inventor: Satoshi Honjo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 15/133,225

(22) Filed: Apr. 20, 2016

(65) Prior Publication Data

US 2016/0308412 A1    Oct. 20, 2016

(30) Foreign Application Priority Data

Apr. 20, 2015 (JP) ................................ 2015-086119

(51) Int. Cl.
*H02K 1/27* (2006.01)
*H02K 15/03* (2006.01)
*H02K 15/12* (2006.01)

(52) U.S. Cl.
CPC ........... *H02K 15/03* (2013.01); *H02K 1/2766* (2013.01); *H02K 15/12* (2013.01); *H02K 2201/06* (2013.01)

(58) Field of Classification Search
CPC ........ H02K 1/27; H02K 1/276; H02K 1/2766; H02K 1/28; H02K 1/32; H02K 9/19; H02K 9/197; H02K 15/00; H02K 15/02; H02K 15/03; H02K 15/16; H02K 15/165; H02K 1/22; H02K 21/12; H02K 21/14
See application file for complete search history.

(56) References Cited

U.S. PATENT DOCUMENTS 6,225,724 B1 * 5/2001 Toide ..................... H02K 1/276
                                                310/156.53
6,876,115 B2 * 4/2005 Takahashi ............... H02K 29/03
                                                310/156.47
(Continued)

FOREIGN PATENT DOCUMENTS

JP    2002247784 A  *  8/2002  ............... H02K 1/27
JP    2004-248422        9/2004
(Continued)

OTHER PUBLICATIONS

Japanese Office Action for corresponding JP Application No. 2015-086119, Nov. 22, 2016.

*Primary Examiner* — Tran Nguyen
(74) *Attorney, Agent, or Firm* — Mori & Ward, LLP (57) ABSTRACT

A second core block is stacked on a first filler-vestige-accommodating steel sheet along a rotational axis and has a plurality of second magnet insertion holes. Each of the plurality of second magnet insertion holes is defined by a second inner wall. Each of a plurality of second permanent magnets is inserted into each of the plurality of second magnet insertion holes. Each of second spaces is provided between each of the plurality of second permanent magnets and the second inner wall. The filler fills the second spaces. The plurality of second magnet insertion holes have a plurality of second filler injection portions, respectively, via which the filler is injected into the plurality of second magnet insertion holes. The first filler-vestige-accommodating steel sheet has a plurality of first hole portions opposite to the plurality of second filler injection portions, respectively.

11 Claims, 6 Drawing Sheets

(56) References Cited

U.S. PATENT DOCUMENTS

| | | | | |
|---|---|---|---|---|
| 7,518,277 | B2* | 4/2009 | Nemoto | H02K 29/03 |
| | | | | 310/156.45 |
| 8,020,280 | B2* | 9/2011 | Fukumaru | H02K 1/2766 |
| | | | | 264/272.2 |
| 8,362,668 | B2* | 1/2013 | Takahashi | H02K 1/2766 |
| | | | | 310/156.47 |
| 2012/0091846 | A1* | 4/2012 | Nagai | H02K 1/2766 |
| | | | | 310/156.01 |
| 2012/0206007 | A1* | 8/2012 | Kitagawa | H02K 1/2766 |
| | | | | 310/156.08 |

FOREIGN PATENT DOCUMENTS

| | | | | |
|---|---|---|---|---|
| JP | 2007-282358 | | 10/2007 | |
| JP | 2007282392 A | * | 10/2007 | ............... H02K 1/27 |
| JP | 4948040 B2 | | 12/2007 | |
| JP | 2014-165938 | | 9/2014 | |

\* cited by examiner

BACKGROUND ART

ROTOR OF ROTATING ELECTRIC MACHINE

CROSS-REFERENCE TO RELATED APPLICATIONS

The present application claims priority under 35 U.S.C. § 119 to Japanese Patent Application No. 2015-086119, filed Apr. 20, 2015, entitled "Rotor of Rotating Electric Machine". The contents of this application are incorporated herein by reference in their entirety.

BACKGROUND

Field of the Invention

The present disclosure relates to a rotor of a rotating electric machine.

Discussion of the Background

In an existing method for fixing permanent magnets to a rotor core of a rotating electric machine, the permanent magnets are inserted into permanent magnet insertion holes and fixed to the rotor core by injecting a resin into the permanent magnet insertion holes by injection molding (see, for example, Japanese Unexamined Patent Application Publication No. 2014-165938). However, if a gate vestige of the injection-molded resin protrudes from the rotor core, the gate vestige may become an obstacle in a subsequent step of assembling a rotor. Therefore, it is necessary to remove the gate vestige beforehand.

Figure 6:
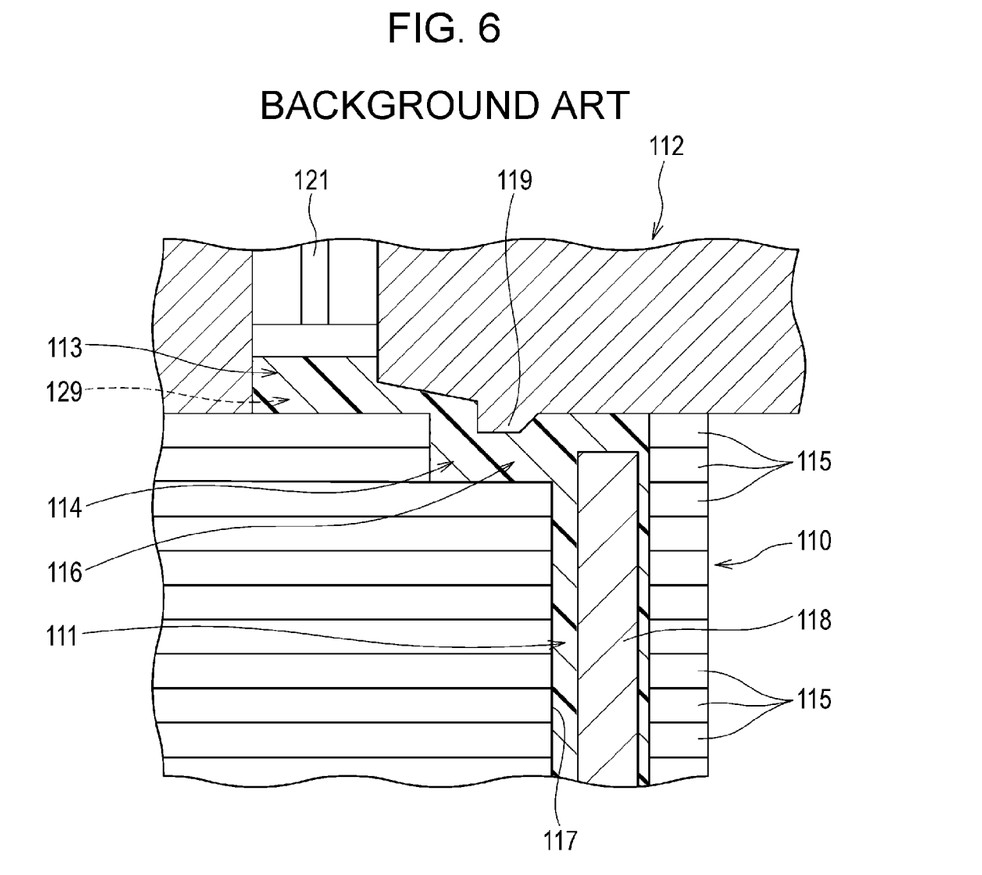
FIG. 6 illustrates an existing resin-sealing method for a rotor core.

FIG. 6 illustrates a resin-sealing method for a rotor core described in Japanese Patent No. 4948040. In this method, a resin 114 is injected from a resin reservoir 113 of a die 112 into a resin sealing portion 111 of a rotor core 110, in which a permanent magnet 118 has been inserted into a permanent magnet insertion hole 117. In doing so, a cutout guide portion 116, which is connected to the resin sealing portion 111 and which accommodates a protrusion 119 of the die 112, is formed in steel sheets 115 of the rotor core 110; and the resin 114 is injected from the resin reservoir 113 into the resin sealing portion 111 through the cutout guide portion 116. After the resin 114 has solidified, a resin (cull) 129 that remains below a plunger 121 is broken off at a recess formed by the protrusion 119 by applying a force to the resin (cull) 129 outward in the radial direction, thereby preventing the resin 114 from protruding from a surface of the rotor core 110.

However, with the resin-sealing method for a rotor core described in Japanese Patent No. 4948040, in which the resin 114 is prevented from protruding from the surface of the rotor core 110 by breaking off the resin (cull) 129 at the cutout guide portion 116, the position at which the resin (cull) 129 is broken off may vary and the resin 114 may be broken off in such a way that the resin 114 protrudes from the surface of the rotor core 110. If the resin 114 protrudes from the rotor core 110, the resin 114 becomes an obstacle in the subsequent step of assembling a rotor. Moreover, if the resin 114 becomes detached and becomes a foreign object, the resin 114 may negatively affect the performance of the rotor, and therefore it is necessary to remove the resin 114 manually. As a result, extra work and time are needed, and the manufacturing cost is increased.

SUMMARY

According to one aspect of the present invention, a rotating electric machine rotor includes a rotor core including a plurality of steel sheets that are stacked and having a plurality of magnet insertion holes that are arranged in a circumferential direction; permanent magnets inserted into the magnet insertion holes; and a filler with which spaces between the permanent magnets and inner walls of the magnet insertion holes are filled. The rotor core includes a first core block in which the steel sheets are stacked, and a second core block in which the steel sheets are stacked and that is disposed adjacent to the first core block. In the first core block, at least one of the steel sheet that faces the second core block is a filler-vestige-accommodating steel sheet that has hole portions located at positions opposed to filler injection portions of the magnet insertion holes of the second core block.

According to another aspect of the present invention, a rotor of a rotating electric machine includes a rotor core, a plurality of first permanent magnets, a plurality of second permanent magnets, and a filler. The rotor core has a rotational axis and a circumference around the rotational axis. The rotor core includes a first core block, a second core block. The first core block includes a first main steel portion and a first filler-vestige-accommodating steel sheet. The first main steel portion has a plurality of first magnet insertion holes arranged along the circumference. Each of the plurality of first magnet insertion holes is defined by a first inner wall. The first filler-vestige-accommodating steel sheet is stacked on the first main steel portion along the rotational axis. The second core block is stacked on the first filler-vestige-accommodating steel sheet along the rotational axis and has a plurality of second magnet insertion holes arranged along the circumference. Each of the plurality of second magnet insertion holes is defined by a second inner wall. Each of the plurality of first permanent magnets is inserted into each of the plurality of first magnet insertion holes. Each of first spaces is provided between each of the plurality of first permanent magnets and the first inner wall. Each of the plurality of second permanent magnets is inserted into each of the plurality of second magnet insertion holes. Each of second spaces is provided between each of the plurality of second permanent magnets and the second inner wall. The filler fills the first spaces and the second spaces. The plurality of second magnet insertion holes have a plurality of second filler injection portions, respectively, via which the filler is injected into the plurality of second magnet insertion holes. The first filler-vestige-accommodating steel sheet has a plurality of first hole portions opposite to the plurality of second filler injection portions, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
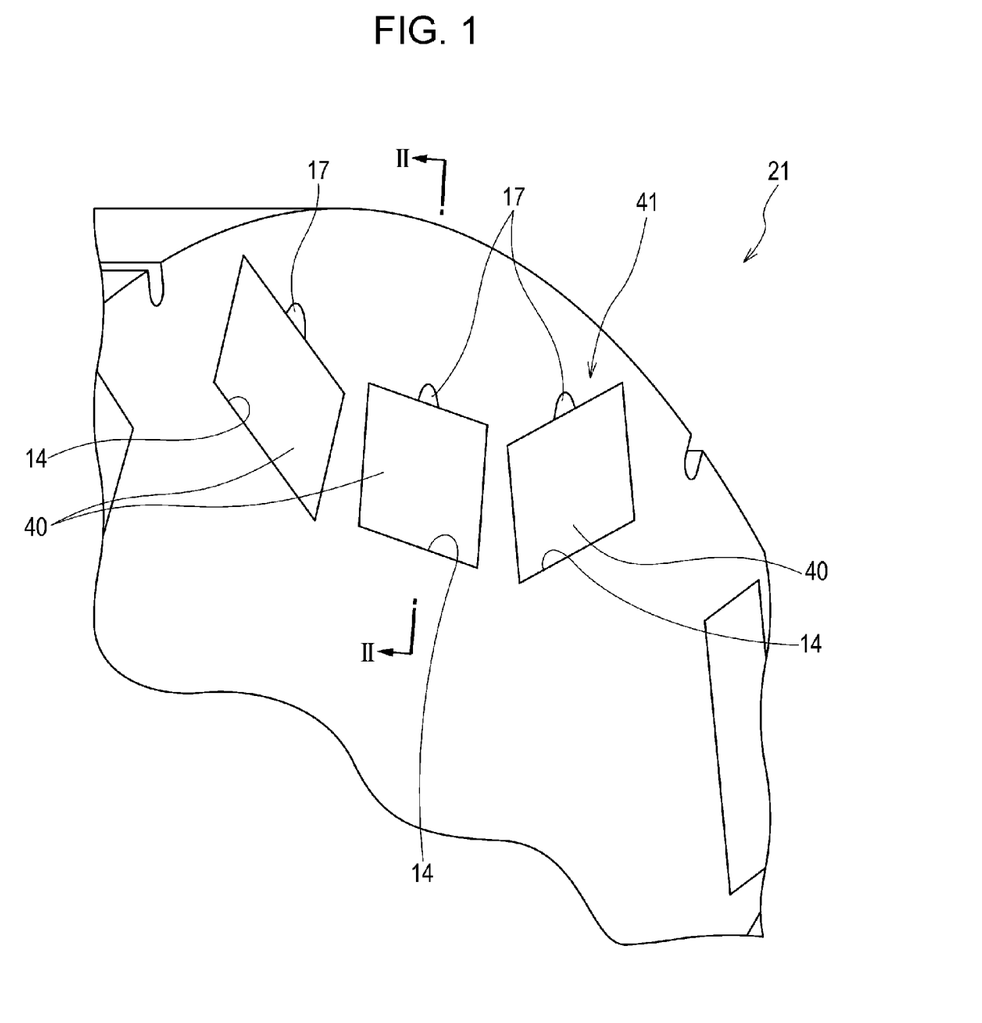
FIG. 1 is a partial enlarged perspective view of a rotor core of a rotating electric machine according to the present disclosure.
Figure 2:
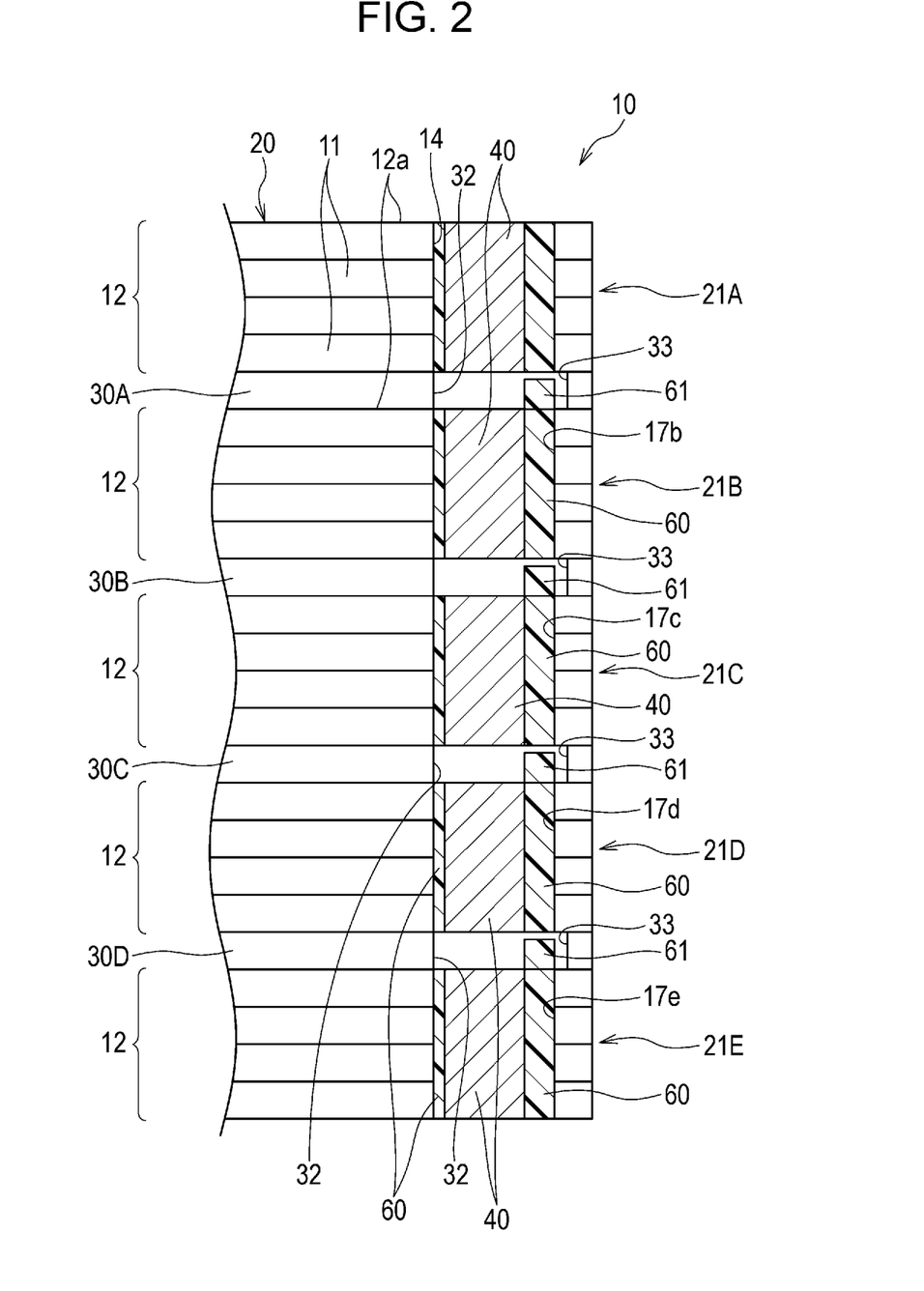
FIG. 2 is a sectional view taken along line II-II in FIG. 1.

Hereinafter, a rotating electric machine rotor according to an embodiment the present disclosure will be described with reference to the drawings. FIG. 1 is a partial enlarged perspective view of a rotor core having magnet insertion holes into which permanent magnets are inserted. FIG. 2 is a sectional view taken along line II-II in FIG. 1. The orientations of the drawings are the same as those of the numerals shown in the drawings.

As illustrated in FIGS. 1 and 2, a rotor 10 according to the present embodiment, which is a so-called permanent-magnet-embedded rotor, includes a rotor core 20, in which five core blocks 21A, 21B, 21C, 21D, and 21E are stacked; and permanent magnets 40, which are inserted into magnet insertion holes 14 of the rotor core 20. Steel sheets that are disposed at at least the lowermost surfaces of the core blocks 21A, 21B, 21C, and 21D are gate-vestige-accommodating steel sheets 30A, 30B, 30C, and 30D (described below), respectively.

In the following description, when it is not necessary to differentiate between the five core blocks 21A, 21B, 21C, 21D, and 21E and between the gate-vestige-accommodating steel sheets 30A, 30B, 30C, and 30D, the former will be referred to as the core block 21, and the latter will be referred to as the gate-vestige-accommodating steel sheet 30. As necessary, the five core blocks 21A, 21B, 21C, 21D, and 21E will be respectively referred to as the first core block 21A, the second core block 21B, the third core block 21C, the fourth core block 21D, and the fifth core block 21E. Likewise, as necessary, the gate-vestige-accommodating steel sheets 30A, 30B, 30C, and 30D will be respectively referred the first gate-vestige-accommodating steel sheet 30A, the second gate-vestige-accommodating steel sheet 30B, the third gate-vestige-accommodating steel sheet 30C, and the fourth gate-vestige-accommodating steel sheet 30D. The same applies to a resin groove 17 described below.

The core block 21 includes a steel sheet stack 12, in which a plurality of electrical steel sheets 11 are stacked; and the gate-vestige-accommodating steel sheet 30, which is disposed at the lowermost surface of the steel sheet stack 12. Each of the electrical steel sheets 11 has a substantially annular shape and has a shaft-insertion hole (not shown) at the center thereof and the magnet insertion holes 14 arranged in the circumferential direction. A set of three magnet insertion holes 14 constitute one magnetic pole portion 41.

In each magnetic pole portion 41, two of the three magnet insertion holes 14 are disposed on both sides of one of the three magnetic insertion holes 14 at the center so as to form a V-shape that is open outward in the radial direction. The magnet insertion holes 14 are open in the axial direction and are independent from each other.

The magnet insertion holes 14 are slightly larger than the permanent magnets 40 inserted thereinto. A set of three permanent magnets 40 magnetized in the same direction are inserted into the three magnet insertion holes 14 of each magnetic pole portion 41. Another set of three permanent magnets 40 magnetized in the opposite direction are disposed in another magnetic pole portion 41 that is adjacent to the magnetic pole portion 41 in the circumferential direction, so that magnetic poles having opposite polarities are alternately arranged in the circumferential direction. Each of the permanent magnets 40 is a segmented permanent magnet that is segmented in the axial direction.

The magnet insertion holes 14 have the resin grooves 17, which are formed in substantially the central portions of outer walls of the magnet insertion holes 14 so as to be recessed outward in the radial direction. A resin 60 passes through the resin grooves 17 when the resin 60 is injected into gaps between the permanent magnets 40, which have been inserted into the magnet insertion holes 14, and the inner walls of the magnet insertion holes 14.

That is, the permanent magnets 40 are fixed to the magnet insertion holes 14 as follows. The permanent magnets 40 are inserted into the magnet insertion holes 14 of the steel sheet stack 12, in which the electrical steel sheets 11 are stacked. Then, the gaps between the magnet insertion holes 14 and the permanent magnets 40 are filled with the resin 60 by injecting the resin 60 into the resin grooves 17 from a nozzle of an injection molding machine (not shown). Note that the resin 60 is not injected into the gate-vestige-accommodating steel sheet 30, which is disposed at the lowermost surface of the steel sheet stack 12.

After the resin 60 has solidified, gates (not shown) that remain between the nozzle and the resin grooves 17 are cut off, and the core block 21 is taken out of the injection molding machine. In general, at this time, parts of the gates may remain on a gate-side end surface 12a, which is located at the uppermost surface of the core block 21, and may protrude from the gate-side end surface 12a. Hereinafter, the parts of the gates that remain on the gate-side end surface 12a will be referred to as gate vestiges 61.

Referring to FIG. 2, one rotor core 20 is manufactured by stacking a plurality of the core blocks 21 (in the embodiment shown in the figures, five core blocks 21), each of which has been made as described above, in the axial direction. Accordingly, the gate-vestige-accommodating steel sheet 30, which is disposed at the lowermost surface of each core block 21, faces a corresponding one of the core blocks 21 that is disposed directly below the core block 21. The core blocks 21 are stacked (rotationally stacked) while rotating the core blocks 21 by a predetermined skew angle in the circumferential direction, so that the effect of the irregularities in the stacked core blocks 21 can be suppressed and the magnetic characteristics of the core blocks 21 can be made uniform.

To be specific, the second core block 21B is disposed adjacent to the first core block 21A so as to be rotated by a skew angle α with respect to the first core block 21A, the third core block 21C is disposed adjacent to the second core block 21B so as to be rotated by a skew angle β with respect to the second core block 21B, the fourth core block 21D is disposed adjacent to the third core block 21C so as to be rotated by a skew angle γ with respect to the third core block 21C, and, finally, the fifth core block 21E is disposed adjacent to the fourth core block 21D so as to be rotated by a skew angle α with respect to the fourth core block 21D.

Because the core blocks 21 are rotationally stacked so as to be rotated in the circumferential direction as described above, the magnet insertion holes 14 and the resin grooves 17 of the core blocks 21 are stacked so as to be displaced from each other by the predetermined skew angles in the circumferential direction.

To be specific, second resin grooves 17b of the second core block 21B, which is disposed at the skew angle α with respect to the first core block 21A, are displaced from first resin grooves 17a by the skew angle α; third resin grooves 17c of the third core block 21C, which is disposed at the skew angle β with respect to the second core block 21B, are displaced from the second resin grooves 17b by the skew angle β; fourth resin grooves 17d of the fourth core block 21D, which is disposed at the skew angle γ with respect to the third core block 21C, are displaced from the third resin grooves 17c by the skew angle γ; and fifth resin grooves 17e of the fifth core block 21E, which is disposed at the skew angle α with respect to the fourth core block 21D, are displaced from the fourth resin grooves 17d in the circumferential direction by the skew angle α (where β<γ<α).

Figure 3:
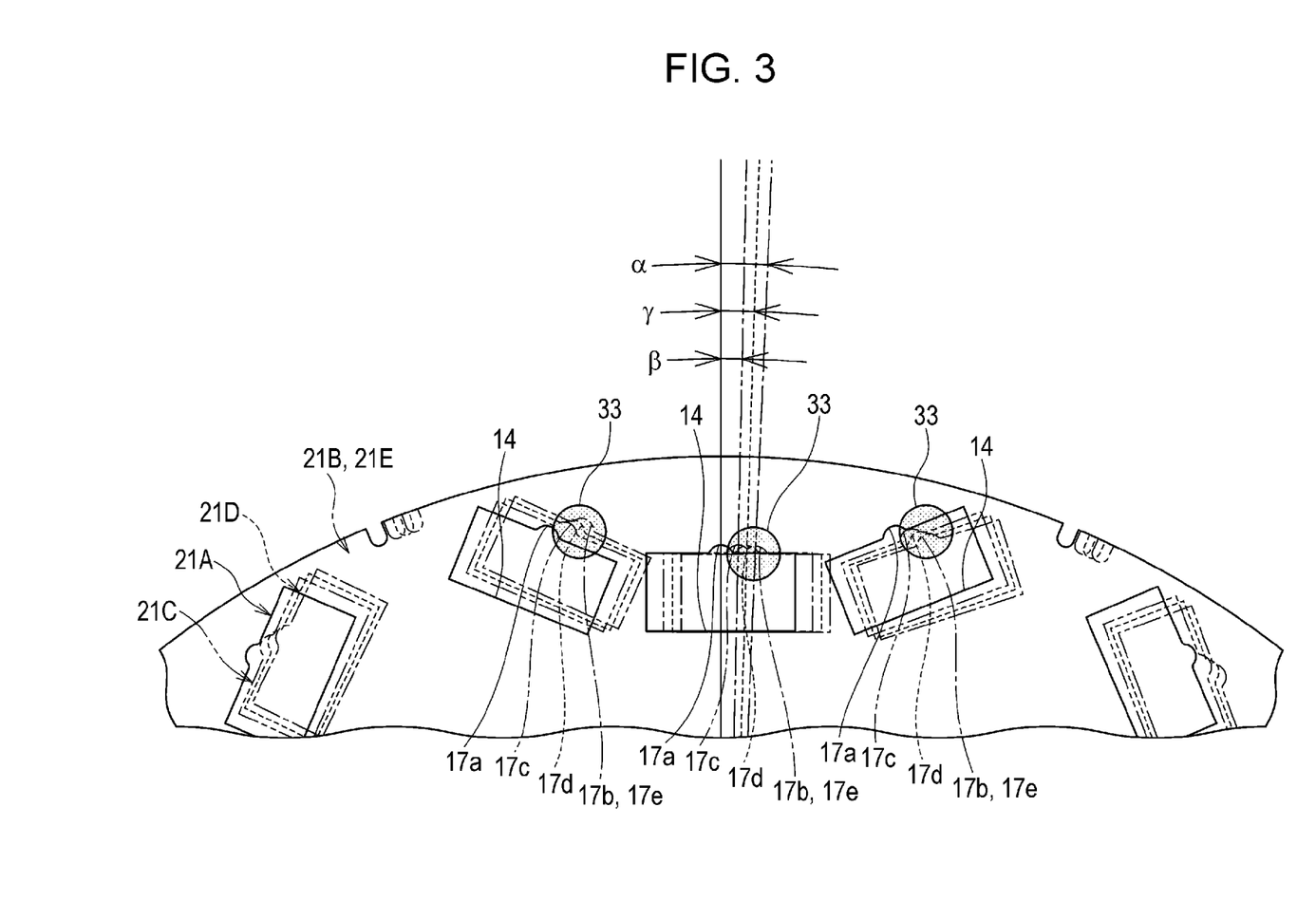
FIG. 3 is a partial enlarged view illustrating the positions of gates of a plurality of core blocks that are rotationally stacked and hole portions of gate-vestige-accommodating steel sheets.

FIG. 3 is a partial enlarged view illustrating the magnet insertion holes 14 and the first to fifth resin grooves 17a, 17b, 17c, 17d, and 17e of the core blocks 21 that are rotationally stacked. FIG. 3 shows, with respect to the first resin grooves 17a of the first core block 21A, the second resin grooves 17b of the second core block 21B and the fifth resin grooves 17e of the fifth core block 21E, which are displaced by the skew angle α; the third resin grooves 17c of the third core block 21C, which are displaced by the skew angle β; and the fourth resin grooves 17d of the fourth core block 21D, which are displaced by the skew angle γ. In reality, with respect to the first resin grooves 17a of the first core block 21A, the second resin grooves 17b of the second core block 21B are displaced by the skew angle α, the third resin grooves 17c of the third core block 21C are displaced by a skew angle (α+β), the fourth resin groove 17d of the fourth core block 21D is displace by a skew angle (α+β+γ), and the fifth resin grooves 17e of the fifth core block 21E are displaced by a skew angle (α+β+γ+α).

Figure 4:
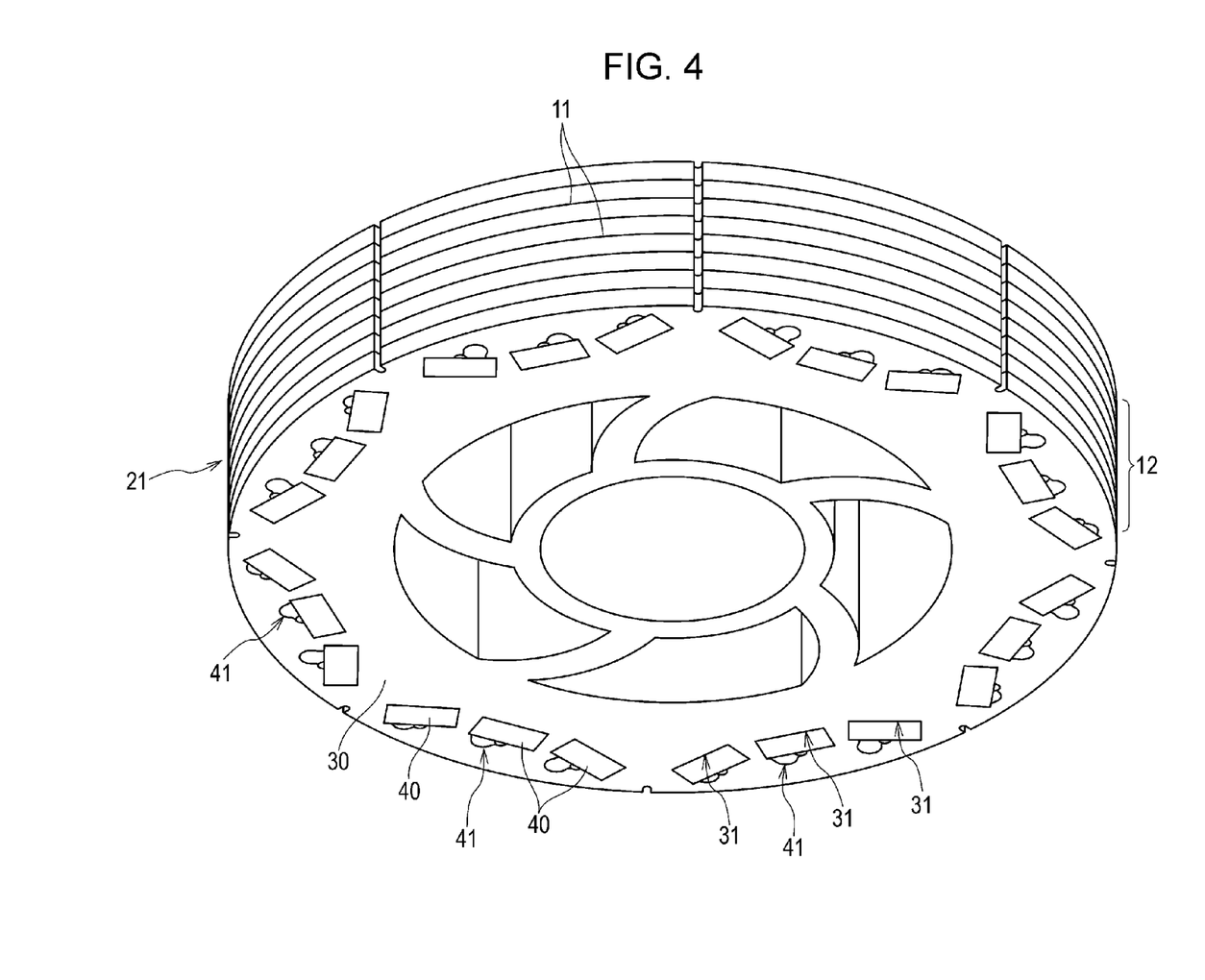
FIG. 4 is a perspective view of a core block in which the gate-vestige-accommodating steel sheet is stacked at the lowermost surface.
Figure 5:
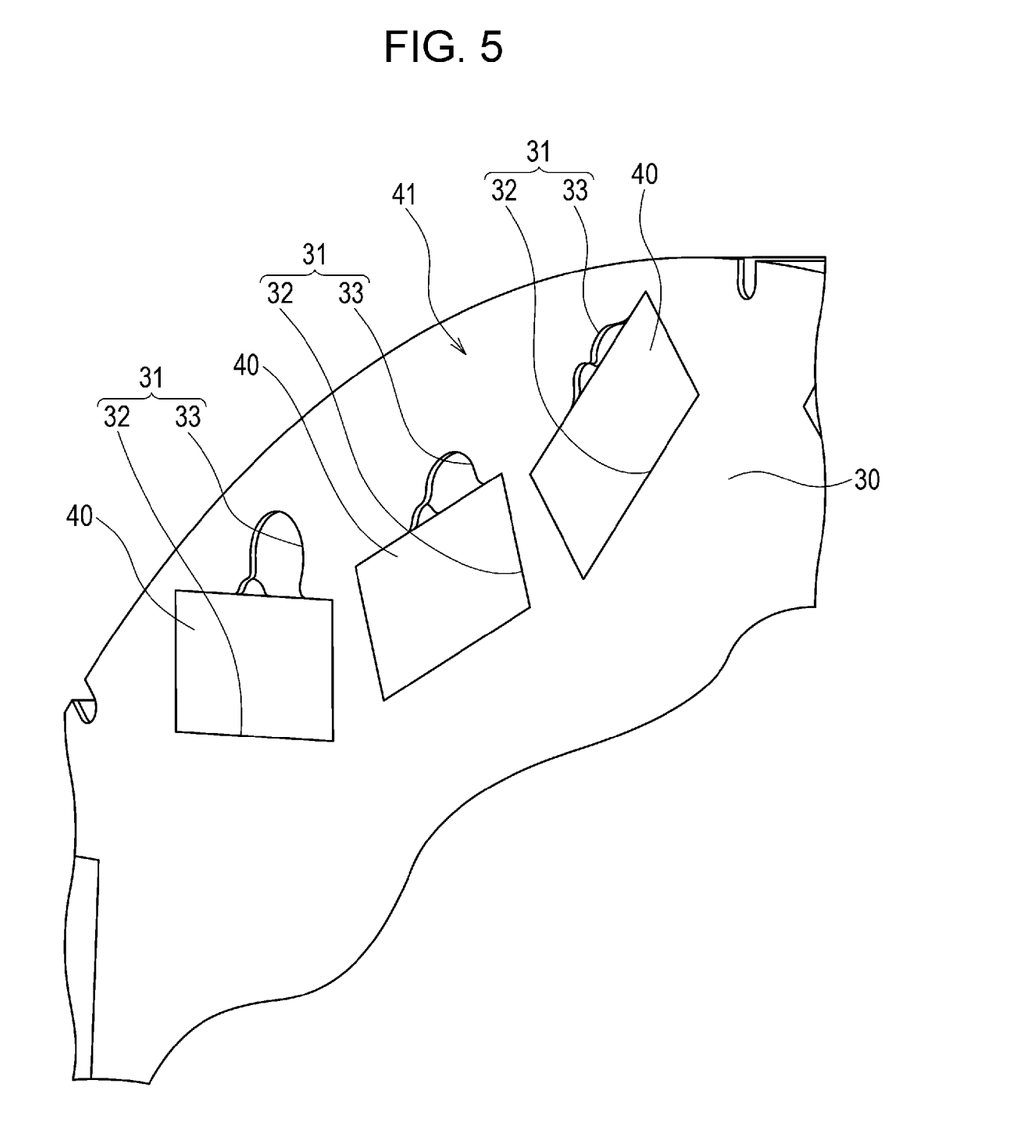
FIG. 5 is a partial enlarged view of FIG. 4.

As illustrated in FIGS. 4 and 5, the gate-vestige-accommodating steel sheet 30 has substantially the same shape as the electrical steel sheet 11 and has hole portions 31 that are open in the axial direction. Each of the hole portions 31 includes a magnet-insertion-hole projected portion 32, which has the same shape as the magnet insertion hole 14 of the electrical steel sheet 11, and a gate-vestige-accommodating hole 33, which has an opening larger than the resin groove 17. The magnet-insertion-hole projected portions 32 are formed at positions corresponding to the magnet insertion holes 14 of the electrical steel sheets 11, and the gate-vestige-accommodating holes 33 are formed at positions corresponding to the resin grooves 17. As illustrated in FIG. 3, each of the gate-vestige-accommodating holes 33 of the gate-vestige-accommodating steel sheet 30 is sized to encompass the second to fifth resin grooves 17b, 17c, 17d, and 17e, which are displaced from the first resin groove 17a by the skew angles α, β, and γ in the circumferential direction with respect to the first resin groove 17a of the first core block 21A (see FIG. 3).

As with the electrical steel sheet 11, the gate-vestige-accommodating steel sheet 30 is preferably made of a magnetic material, and is preferably made of the same material as the electrical steel sheet 11. Preferably, the thickness of the gate-vestige-accommodating steel sheet 30 is substantially the same as that of the electrical steel sheet 11. In other words, the gate-vestige-accommodating steel sheet 30 can be made by additionally processing clearance holes in the electrical steel sheet 11, in which the magnet insertion holes 14 have been formed, each of the clearance holes being sized to encompass the second to fifth resin grooves 17b, 17c, 17d, and 17e of the core blocks 21, which are rotationally stacked with the skew angles α, β, and γ.

The length of each of the gate-vestige-accommodating holes 33 in the circumferential direction is set so that the gate-vestige-accommodating hole 33 encompasses the second resin groove 17b (the fifth resin groove 17e) located at the skew angle α, which is the largest one of the skew angles α, β, and γ, and the third resin groove 17c located at the skew angle β, which is the smallest one of the skew angles α, β, and γ. By doing so, the clearance holes that encompass all of the second to fifth resin grooves 17b, 17c, 17d, and 17e can be formed. For example, the fourth gate-vestige-accommodating steel sheet 30D, which is disposed at the lowermost part of the fourth core block 21D, is configured as follows. The fifth resin grooves 17e of the fifth core block 21E, which are displaced by the skew angle (α+β+γ+α) with respect to the first resin grooves 17a of the first core block 21A, are displaced by the skew angle α with respect to the fourth resin grooves 17d of the fourth core block 21D, which is adjacent to the fifth core block 21E. Therefore, the gate vestiges 61 that remain in the fifth resin grooves 17e are accommodated in the gate-vestige-accommodating holes 33 of the fourth gate-vestige-accommodating steel sheet 30D, which is disposed at the lowermost part of the fourth core block 21D.

As illustrated in FIG. 3, in the present embodiment, the gate-vestige-accommodating holes 33 are formed by additionally processing circular clearance holes. However, because the gate-vestige-accommodating holes 33 overlap the magnet-insertion-hole projected portions 32, each of the gate-vestige-accommodating holes 33 does not have a circular shape but has such a shape that a part of a circle is cut out. Note that the hole portions 31 (the magnet-insertion-hole projected portions 32 and the gate-vestige-accommodating holes 33) may be formed by a single punching operation.

Referring back to FIG. 2, in the rotor core 20, the second to fifth core blocks 21B to 21E are rotationally stacked on the first core block 21A so as to be rotated by the predetermined skew angles α, β, γ, and α. Therefore, even if the gate vestiges 61, which remain in the resin grooves 17 of the core blocks 21, protrude from the gate-side end surfaces 12a of the steel sheet stacks 12, the gate vestiges 61 are accommodated in the gate-vestige-accommodating holes 33 of the gate-vestige-accommodating steel sheets 30. As a result, interference between the gate vestiges 61 and the adjacent core block 21 can be prevented. That is, the gate vestiges 61 remaining in the second resin grooves 17b of the second core block 21B are accommodated in the gate-vestige-accommodating holes 33 of the first gate-vestige-accommodating steel sheet 30A, the gate vestiges 61 remaining in the third resin grooves 17c of the third core block 21C are accommodated in the gate-vestige-accommodating holes 33 of the second gate-vestige-accommodating steel sheet 30B, the gate vestiges 61 remaining in the fourth resin grooves 17d of the fourth core block 21D are accommodated in the gate-vestige-accommodating holes 33 of the third gate-vestige-accommodating steel sheet 30C, and the gate vestiges 61 remaining in the fifth resin grooves 17e of the fifth core block 21E are accommodated in the gate-vestige-accommodating holes 33 of the fourth gate-vestige-accommodating steel sheet 30D.

Thus, in the rotor 10, because the gate-vestige-accommodating steel sheet 30 is disposed at the lowermost surface of each core block 21, the gate vestiges 61 is accommodated in the gate-vestige-accommodating holes 33 and do not interfere with the adjacent core block 21, so that a gap is not generated between the core blocks 21 that are stacked.

It is necessary that the protruding height of the gate vestiges 61 from the gate-side end surface 12a be less than the thickness of the gate-vestige-accommodating steel sheet 30. However, the gate vestiges 61 are allowed to protrude from the gate-side end surface q12a, as long as the protruding height is less than or equal to the thickness of the gate-vestige-accommodating steel sheet 30. Therefore, an operation of cutting off the gate vestiges 61 can be facilitated. As necessary, the gate-vestige-accommodating steel sheet 30 having a large thickness may be used, or a plurality of the gate-vestige-accommodating steel sheets 30, each having the same thickness as the electrical steel sheet 11, may be used.

As described above, with the rotor 10 according to the present embodiment, in the first core block 21A, at least one of the steel sheets that faces the second core block 21B is the first gate-vestige-accommodating steel sheet 30A, which has the gate-vestige-accommodating holes 33 located at positions opposed to the second resin grooves 17b of the second core block 21B. Therefore, even if the gate vestiges 61 adhere to the second resin grooves 17b and protrude, the adhering gate vestiges 61 can be accommodated in the gate-vestige-accommodating holes 33, and therefore it is not necessary to perform an operation of removing the adhering gate vestiges 61. Thus, the number of manufacturing steps can be reduced, and the rotor 10 can be efficiently assembled. Moreover, even if the adhering gate vestige 61 becomes detached and becomes a foreign object, because the foreign object is accommodated in the gate-vestige-accommodating hole 33, a negative effect on the performance of the rotor can be avoided.

By rotationally stacking the second core block 21B on the first core block 21A so as to be rotated by the skew angle α with respect to the first core block 21A, the effect of the irregularities in the stacked core blocks 21 can be suppressed and the magnetic characteristics of the stack core block 21 can be made uniform. Even when the first core block 21A and the second core block 21B are rotationally stacked, the first gate-vestige-accommodating steel sheet 30A has the gate-vestige-accommodating holes 33 located at positions opposed to the second resin grooves 17b of the second core block 21B. Therefore, the gate vestiges 61 adhering to the second resin grooves 17b can be accommodated in the gate-vestige-accommodating holes 33, and it is not necessary to perform an operation of removing the gate vestiges 61 adhering to the second resin grooves 17b, and a negative effect on the performance of the rotor can be avoided.

By rotationally stacking the third core block 21C on the first core block 21A and the second core block 21B, which have been rotationally stacked, at the skew angle β with respect to the first core block 21A, the effect of the irregularities in the stacked core blocks 21 can be further suppressed and the magnetic characteristics can be made further uniform. The skew angle between the first core block 21A and the second core block 21B may differ from the skew angle between the second core block 21B and the third core block 21C. Even in this case, as illustrated in FIG. 3, by setting the length of each of the gate-vestige-accommodating holes 33 in the circumferential direction so that the gate-vestige-accommodating hole 33 encompasses the second resin groove 17b located at the skew angle α and the third resin groove 17c located at the skew angle β, the gate vestiges 61 adhering to the second core block 21B and the gate vestiges 61 adhering to the third core block 21C can be accommodated in the gate-vestige-accommodating holes 33. Accordingly, it is not necessary to perform an operation of removing the adhering gate vestiges 61, and a negative effect on the performance of the rotor can be avoided. Moreover, the manufacturing cost can be reduced, because the gate-vestige-accommodating steel sheets 30 having the same shape can be used.

By rotationally stacking the fourth core block 21D on the first to third core blocks 21A, 21B, and 21C, which have been rotationally stacked, the effect of the irregularities in the stacked core blocks 21 can be suppressed, and the magnetic characteristics can be made further uniform. The skew angles between the rotationally stacked core blocks 21 may differ from each other. Even in this case, by setting the length of each of the gate-vestige-accommodating holes 33 in the circumferential direction so that the gate-vestige-accommodating hole 33 encompasses one of the resin grooves 17 located at the largest one of the different skew angles and one of the resin grooves 17 located at the smallest one of the skew angles, the gate vestiges 61 adhering to the core blocks 21 can be accommodated in the gate-vestige-accommodating holes 33. Accordingly, it is not necessary to perform an operation of removing the adhering gate vestiges 61, and a negative effect on the rotor performance can be avoided. Moreover, the manufacturing cost can be reduced, because the gate-vestige-accommodating steel sheets 30 having the same shape can be used.

In the embodiment described above, the first to fifth core blocks are stacked. Additionally, the sixth, seventh, and more core blocks may be rotationally stacked in the same way while changing the skew angle. Also in this case, by setting the length of each of the gate-vestige-accommodating holes 33 in the circumferential direction so that the gate-vestige-accommodating hole 33 encompasses one of the resin grooves 17 located at the largest skew angle and one of the resin grooves 17 located at the smallest skew angle, the gate-vestige-accommodating steel sheets 30 between the core blocks 21 can be made to have the same shape. There may be at least two core blocks 21.

The present disclosure is not limited to the embodiment described above, which may be modified or improved as appropriate. For example, the magnitude relationship among the skew angles α, β, and γ may be appropriately set with consideration of the magnetic characteristics and the like. The shape of the resin groove 17 may be appropriately set. The number of the electrical steel sheets 11 included in each block may be appropriate set, and may be, for example, several tens to several hundreds. All the gate-vestige-accommodating steel sheets 30 need not have the same size, and may have different sizes. It is not necessary that the gate-vestige-accommodating steel sheet 30 have the magnet-insertion-hole projected portions 32.

In the embodiment described above, the gate-vestige-accommodating steel sheet 30 is disposed at the lowermost surface of each core block, and it is assumed that the gate vestiges 61 remaining on the surface of the first core block 21A are ground. However, this is not a limitation, and the gate-vestige-accommodating steel sheet 30 may be disposed on a surface of the first core block 21A. In this case, by forming each of the gate-vestige-accommodating holes 33 of the gate-vestige-accommodating steel sheet 30 so as to have a size with which the gate-vestige-accommodating hole 33 encompasses the first resin groove 17a at a skew angle of zero, the gate-vestige-accommodating steel sheet 30 disposed between the core blocks can be also used as the gate-vestige-accommodating steel sheet 30 disposed on the surface of the first core block 21A.

The present application describes a rotating electric machine rotor that can be manufactured through a simplified manufacturing process and can be assembled efficiently without being affected by a filler vestige.

According to an aspect of the present disclosure, a rotating electric machine rotor (for example, a rotor 10 in the embodiment described below) includes a rotor core (for example, a rotor core 20 in the embodiment described below) including a plurality of steel sheets (for example, electrical steel sheets 11 in the embodiment described below) that are stacked and having a plurality of magnet insertion holes (for example, magnet insertion holes 14 in the embodiment described below) that are arranged in a circumferential direction; permanent magnets (for example, permanent magnets 40 in the embodiment described below) inserted into the magnet insertion holes; and a filler (for example, a resin 60 in the embodiment described below) with which spaces between the permanent magnets and inner walls of the magnet insertion holes are filled. The rotor core includes a first core block (for example, a first core block 21A in the embodiment described below) in which the steel sheets are stacked, and a second core block (for example, a second core block 21B in the embodiment described below) in which the steel sheets are stacked and that is disposed adjacent to the first core block. In the first core block, at least one of the steel sheet that faces the second core block is a filler-vestige-accommodating steel sheet (for example, a first gate-vestige-accommodating steel sheet 30A in the embodiment described below) that has hole portions (for example, gate-vestige-accommodating holes 33 in the embodiment described below) located at positions opposed to filler injection portions (for example, second resin grooves 17b in the embodiment described below) of the magnet insertion holes of the second core block.

With the aspect of the present disclosure, in the first core block, at least one of the steel sheets that faces the second core block is the filler-vestige-accommodating steel sheet, which has the hole portions located at positions opposed to the filler injection portions of the second core block. Therefore, even if the filler adheres to the filler injection portions and protrudes, the adhering filler can be accommodated in the hole portions of the filler-vestige-accommodating steel sheet, and therefore it is not necessary to perform an operation of removing the adhering filler. Thus, the number of manufacturing steps can be reduced, and the rotor can be efficiently assembled. Moreover, even if the adhering filler becomes detached and becomes a foreign object, because the foreign object is accommodated in the hole portion, a negative effect on the performance of the rotor can be avoided.

In the rotating electric machine rotor, the second core block may be disposed adjacent to the first core block so as to be rotated by a first rotation angle (for example, a skew angle α in the embodiment described below) with respect to the first core block, and the hole portions may be located at positions opposed to the filler injection portions of the magnet insertion holes of the second core block, which is rotated by the first rotation angle.

In this case, by disposing the second core block adjacent to the first core block so as to be rotated with respect to the first core block (hereinafter, stacking a core block on another core block so as to be rotated with respect to the other core block will be referred to as "rotational stacking"), the effect of the irregularities in the stacked core blocks can be suppressed and the magnetic characteristics of the stacked core blocks can be made uniform. Even when the first core block and the second core block are rotationally stacked, the filler-vestige-accommodating steel sheet has the filler injection portions located at positions opposed to the filler injection portions of the second core block. Therefore, the filler adhering to the filler injection portions can be accommodated in the hole portions, and it is not necessary to perform an operation of removing the adhering filler, and a negative effect on the performance of the rotor can be avoided.

In the rotating electric machine rotor, the rotor core may further include a third core block (for example, a third core block 21C in the embodiment described below) in which a plurality of the steel sheets are stacked, that is rotated by a second rotation angle (for example, a skew angle β in the embodiment described below) with respect to the second core block, and that is disposed adjacent to the second core block. In the second core block, at least one of the steel sheets that faces the third core block may be a filler-vestige-accommodating steel sheet (for example, a second gate-vestige-accommodating steel sheet 30B in the embodiment described below) that has hole portions (for example, gate-vestige-accommodating holes 33 in the embodiment described below) located at positions opposed to filler injection portions (for example, third resin grooves 17c in the embodiment described below) of the magnet insertion holes of the third core block, which is rotated by the second rotation angle. The filler-vestige-accommodating steel sheet of the first core block and the filler-vestige-accommodating steel sheet of the second core block may have the same shape. A length of each of the hole portions in the circumferential direction may be set so that the hole portion encompasses a corresponding one of the filler injection portions located at the first rotation angle and a corresponding one of the filler injection portions located at the second rotation angle.

In this case, by rotationally stacking the third core block on the first core block and the second core block, which have been rotationally stacked, the effect of the irregularities in the stacked core blocks can be further suppressed and the magnetic characteristics can be made further uniform. The rotation angle between the first core block and the second core block (hereinafter, a rotation angle in rotational stacking will be referred to as a "skew angle") may differ from the rotation angle between the second core block and the third core block. Even in this case, by setting the length of each of the hole portions in the circumferential direction so that the hole portion encompasses one of the filler injection portions located at the first rotation angle and one of the filler injection portions located at the second rotation angle, the filler adhering to the second core block and the filler adhering to the third core block can be accommodated in the hole portions. Accordingly, it is not necessary to perform an operation of removing the adhering filler, and a negative effect on the performance of the rotor can be avoided. Moreover, the manufacturing cost can be reduced, because the filler-vestige-accommodating steel sheets having the same shape can be used.

In the rotating electric machine rotor, the rotor core may further include a third core block (for example, a third core block 21C in the embodiment described below) in which a plurality of the steel sheets are stacked, that is rotated by a second rotation angle (for example, a skew angle β in the embodiment described below) with respect to the second core block, and that is disposed adjacent to the second core block; and a fourth core block (for example, a fourth core block 21D in the embodiment described below) in which a plurality of the steel sheets are stacked, that is rotated by a third rotation angle (for example, a skew angle γ in the embodiment described below) with respect to the third core block, and that is disposed adjacent to the third core block. In the second core block, at least one of the steel sheets that faces the third core block may be a filler-vestige-accommodating steel sheet (for example, a second gate-vestigeaccommodating steel sheet 30B in the embodiment described below) that has hole portions (for example, gate-vestige-accommodating holes 33 in the embodiment described below) located at positions opposed to filler injection portions (for example, third resin grooves 17c in the embodiment described below) of the magnet insertion holes of the third core block, which is rotated by the second rotation angle. In the third core block, at least one of the steel sheets that faces the fourth core block may be a filler-vestige-accommodating steel sheet (for example, a third gate-vestige-accommodating steel sheet 30C in the embodiment described below) that has hole portions (for example, gate-vestige-accommodating holes 33 in the embodiment described below) located at positions opposed to filler injection portions (for example, fourth resin grooves 17d in the embodiment described below) of the magnet insertion holes of the fourth core block, which is rotated by the third rotation angle. The filler-vestige-accommodating steel sheet of the first core block, the filler-vestige-accommodating steel sheet of the second core block, and the filler-vestige-accommodating steel sheet of the third core block may have the same shape. A length of each of the hole portions in the circumferential direction may set so that the hole portion encompasses one of the filler injection portions located at a largest one of the first, second, and third rotation angles (for example, a skew angle $\alpha$ in the embodiment described below) and one of the filler injection portions located at a smallest one of the first, second, and third rotation angles (for example, a skew angle $\gamma$ in the embodiment described below).

In this case, by rotationally stacking the first to fourth core blocks, the effect of the irregularities in the stacked core blocks can be suppressed, and the magnetic characteristics can be made further uniform. The skew angles between the rotationally stacked core blocks may differ from each other. Even in this case, by setting the length of each of the hole portions in the circumferential direction so that the hole portion encompasses one of the filler injection grooves located at the largest one of the different skew angles and one of the filler injection portions located at the smallest one of the skew angles, the filler adhering to the core blocks can be accommodated in the hole portions. Accordingly, it is not necessary to perform an operation of removing the adhering filler, and a negative effect on the rotor performance can be avoided. Moreover, the manufacturing cost can be reduced, because the filler-vestige-accommodating steel sheets having the same shape can be used.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor of a rotating electric machine, comprising:
   a rotor core including a plurality of steel sheets that are stacked and having a plurality of magnet insertion holes that are arranged in a circumferential direction;
   permanent magnets inserted into the magnet insertion holes; and
   a filler with which spaces between the permanent magnets and inner walls of the magnet insertion holes are filled,
   wherein the rotor core includes
      a first core block in which a plurality of the steel sheets are stacked, and
      a second core block in which a plurality of the steel sheets are stacked and that is disposed adjacent to the first core block, and wherein, in the first core block, at least one of the steel sheets that faces the second core block is a filler-vestige-accommodating steel sheet that has hole portions located at positions opposed to filler injection portions of the magnet insertion holes of the second core block.

2. The rotor according to claim 1,
   wherein the second core block is disposed adjacent to the first core block so as to be rotated by a first rotation angle with respect to the first core block, and
   wherein the hole portions are located at positions opposed to the filler injection portions of the magnet insertion holes of the second core block, which is rotated by the first rotation angle.

3. The rotor according to claim 2,
   wherein the rotor core further includes
      a third core block in which a plurality of the steel sheets are stacked, that is rotated by a second rotation angle with respect to the second core block, and that is disposed adjacent to the second core block,
   wherein, in the second core block, at least one of the steel sheets that faces the third core block is a filler-vestige-accommodating steel sheet that has hole portions located at positions opposed to filler injection portions of the magnet insertion holes of the third core block, which is rotated by the second rotation angle,
   wherein the filler-vestige-accommodating steel sheet of the first core block and the filler-vestige-accommodating steel sheet of the second core block have the same shape, and
   wherein a length of each of the hole portions in the circumferential direction is set so that the hole portion encompasses a corresponding one of the filler injection portions located at the first rotation angle and a corresponding one of the filler injection portions located at the second rotation angle.

4. The rotor according to claim 2,
   wherein the rotor core further includes
      a third core block in which a plurality of the steel sheets are stacked, that is rotated by a second rotation angle with respect to the second core block, and that is disposed adjacent to the second core block, and
      a fourth core block in which a plurality of the steel sheets are stacked, that is rotated by a third rotation angle with respect to the third core block, and that is disposed adjacent to the third core block,
   wherein, in the second core block, at least one of the steel sheets that faces the third core block is a filler-vestige-accommodating steel sheet that has hole portions located at positions opposed to filler injection portions of the magnet insertion holes of the third core block, which is rotated by the second rotation angle,
   wherein, in the third core block, at least one of the steel sheets that faces the fourth core block is a filler-vestige-accommodating steel sheet that has hole portions located at positions opposed to filler injection portions of the magnet insertion holes of the fourth core block, which is rotated by the third rotation angle,
   wherein the filler-vestige-accommodating steel sheet of the first core block, the filler-vestige-accommodating steel sheet of the second core block, and the filler-vestige-accommodating steel sheet of the third core block have the same shape, and
   wherein a length of each of the hole portions in the circumferential direction is set so that the hole portion encompasses one of the filler injection portions that is located at a largest one of the first, second, and third rotation angles and one of the filler injection portions that is located at a smallest one of the first, second, and third rotation angles.

5. A rotor of a rotating electric machine, comprising:
a rotor core having a rotational axis and a circumference around the rotational axis, the rotor core comprising:
   a first core block comprising:
      a first main steel portion having a plurality of first magnet insertion holes arranged along the circumference, each of the plurality of first magnet insertion holes being defined by a first inner wall; and
      a first filler-vestige-accommodating steel sheet stacked on the first main steel portion along the rotational axis; and
   a second core block stacked on the first filler-vestige-accommodating steel sheet along the rotational axis and having a plurality of second magnet insertion holes arranged along the circumference, each of the plurality of second magnet insertion holes being defined by a second inner wall;
a plurality of first permanent magnets each being inserted into each of the plurality of first magnet insertion holes, first spaces each being provided between each of the plurality of first permanent magnets and the first inner wall;
a plurality of second permanent magnets each being inserted into each of the plurality of second magnet insertion holes, second spaces each being provided between each of the plurality of second permanent magnets and the second inner wall;
a filler filling the first spaces and the second spaces;
the plurality of second magnet insertion holes having a plurality of second filler injection portions, respectively, via which the filler is injected into the plurality of second magnet insertion holes; and
the first filler-vestige-accommodating steel sheet having a plurality of first hole portions opposite to the plurality of second filler injection portions, respectively.

6. The rotor according to claim 5,
wherein the plurality of first magnet insertion holes includes a first hole,
the plurality of second magnet insertion holes includes a second hole opposite to the first hole, and
the second hole is provided to be displaced with respect to the first hole by a first rotation angle with respect to the rotational axis.

7. The rotor according to claim 6,
wherein the rotor core further comprises
   a third core block stacked on the second core block along the rotational axis, the third core block having a plurality of third magnet insertion holes arranged along the circumference, the plurality of third magnet insertion holes including a third hole opposite to the second hole to be displaced with respect to the second hole by a second rotation angle with respect to the rotational axis, the plurality of third magnet insertion holes having a plurality of third filler injection portions, respectively, via which the filler is injected into the plurality of third magnet insertion holes,
wherein the second core block comprises:
   a second main steel portion having the plurality of second magnet insertion holes; and
   a second filler-vestige-accommodating steel sheet sandwiched by the second main steel portion and the third core block along the rotational axis, the second filler-vestige-accommodating steel sheet having a plurality of second hole portions opposite to the plurality of third filler injection portions, respectively,
wherein the first filler-vestige-accommodating steel sheet and the second filler-vestige-accommodating steel sheet have the same shape such that the plurality of first hole portions and the plurality of second hole portions are overlapped with the plurality of the second filler injection portions and the plurality of the third filler injection portions, respectively, viewed along the rotational axis.

8. The rotor according to claim 6,
wherein the rotor core further comprises:
   a third core block stacked on the second core block along the rotational axis, the third core block having a plurality of third magnet insertion holes arranged along the circumference, the plurality of third magnet insertion holes including a third hole opposite to the second hole to be displaced with respect to the second hole by a second rotation angle with respect to the rotational axis, the plurality of third magnet insertion holes having a plurality of third filler injection portions, respectively, via which the filler is injected into the plurality of third magnet insertion holes; and
   a fourth core block stacked on the third core block along the rotational axis, the fourth core block having a plurality of fourth magnet insertion holes arranged along the circumference, the plurality of fourth magnet insertion holes including a fourth hole opposite to the third hole to be displaced with respect to the third hole by a third rotation angle with respect to the rotational axis, the plurality of fourth magnet insertion holes having a plurality of fourth filler injection portions, respectively, via which the filler is injected into the plurality of fourth magnet insertion holes,
wherein the second core block comprises:
   a second main steel portion having the plurality of second magnet insertion holes; and
   a second filler-vestige-accommodating steel sheet sandwiched by the second main steel portion and the third core block, the second filler-vestige-accommodating steel sheet having a plurality of second hole portions opposite to the plurality of third filler injection portions, respectively,
wherein the third core block comprises:
   a third main steel portion having the plurality of third magnet insertion holes; and
   a third filler-vestige-accommodating steel sheet sandwiched by the third main steel portion and the fourth core block, the third filler-vestige-accommodating steel sheet having a plurality of third hole portions opposite to the plurality of the fourth filler injection portions, respectively,
wherein the first filler-vestige-accommodating steel sheet, the second filler-vestige-accommodating steel sheet, and the third filler-vestige-accommodating steel sheet have the same shape such that the plurality of first hole portions, the plurality of second hole portions, and the plurality of third hole portions are overlapped with the plurality of the second filler injection portions, the plurality of the third filler injection portions, and the plurality of the fourth filler injection portions, respectively, viewed along the rotational axis.

9. The rotor according to claim 5, wherein
the first main steel portion includes a plurality of first steel sheets stacked on the first filler-vestige-accommodating steel sheet along the rotational axis.

10. The rotor according to claim 7, wherein
the first main steel portion includes a plurality of first steel sheets stacked on the first filler-vestige-accommodating steel sheet along the rotational axis, and
the second main steel portion includes a plurality of second steel sheets stacked on the second filler-vestige-accommodating steel sheet along the rotational axis.

11. The rotor according to claim 8, wherein
the first main steel portion includes a plurality of first steel sheets stacked on the first filler-vestige-accommodating steel sheet along the rotational axis,
the second main steel portion includes a plurality of second steel sheets stacked on the second filler-vestige-accommodating steel sheet along the rotational axis, and
the third main steel portion includes a plurality of third steel sheets stacked on the third filler-vestige-accommodating steel sheet along the rotational axis.

* * * * *